United States Patent
Namie et al.

(10) Patent No.: US 10,126,718 B2
(45) Date of Patent: Nov. 13, 2018

(54) CONTROL DEVICE, CONTROL PROGRAM, AND RECORDING MEDIUM

(71) Applicant: OMRON Corporation, Kyoto-shi, Kyoto (JP)

(72) Inventors: Masaki Namie, Takatsuki (JP); Mikiko Manabe, Takatsuki (JP)

(73) Assignee: OMRON Corporation, Kyoto-shi (JP)

( * ) Notice: Subject to any disclaimer, the term of this patent is extended or adjusted under 35 U.S.C. 154(b) by 71 days.

(21) Appl. No.: 15/342,422

(22) Filed: Nov. 3, 2016

(65) Prior Publication Data
US 2017/0153609 A1   Jun. 1, 2017

(30) Foreign Application Priority Data
Nov. 30, 2015   (JP) ................................. 2015-234260

(51) Int. Cl.
F16D 48/06   (2006.01)
F16D 48/02   (2006.01)
(Continued)

(52) U.S. Cl.
CPC ......... G05B 13/026 (2013.01); G05B 13/048 (2013.01); G05B 23/0254 (2013.01)

(58) Field of Classification Search
CPC ................................................... G05B 13/026
See application file for complete search history.

(56) References Cited

U.S. PATENT DOCUMENTS 5,048,495 A * 9/1991 Onari ................. F02D 41/04
                                              123/492
5,434,783 A * 7/1995 Pal .................. G05B 13/027
                                              701/36
(Continued)

FOREIGN PATENT DOCUMENTS

JP   2004-364396 A   12/2004
JP   2008-157059 A    7/2008
(Continued)

OTHER PUBLICATIONS

Sheppard C P et al, A Neural Network based Furnace Control System, Proceedings of the American Control Conference (ACC). Jun. 24-26, 1992, pp. 500-504, XP031430750, ISBN: 978-0-7803-0210-5, Chicago and New York.
(Continued)

Primary Examiner — Ramesh B Patel
(74) Attorney, Agent, or Firm — Metrolexis Law Group, PLLC (57) ABSTRACT

A characteristic change, disturbance, and an abnormal state are accurately detected with no use of a high-accuracy simulation model. A control device for controlling a control target includes a predictive value calculator that outputs a predictive value of an output value to an input value with respect to a model of the control target, a prediction error calculator that calculates a relational value indicating a relationship between the predictive value and a measured value of output of the control target; and a change detector that compares a first relational value to a second relational value, the first relational value being the relational value in a reference state in which the control target operates normally, the second relational value being the relational value in an operating state in which the control target is operated.

8 Claims, 10 Drawing Sheets

(51) Int. Cl.
*G05B 13/02* (2006.01)
*G05B 13/04* (2006.01)
*G05B 23/02* (2006.01)

(56) References Cited

U.S. PATENT DOCUMENTS

| | | | | |
|---|---|---|---|---|
| 6,225,609 | B1* | 5/2001 | Imanari | B21B 37/76 |
| | | | | 164/154.6 |
| 6,453,308 | B1* | 9/2002 | Zhao | G05B 13/048 |
| | | | | 702/24 |
| 9,581,980 | B2* | 2/2017 | Badwe | G05B 13/048 |
| 2005/0171626 | A1* | 8/2005 | Schwarm | G05B 23/0294 |
| | | | | 700/108 |
| 2005/0267608 | A1* | 12/2005 | Nishira | B60K 31/0008 |
| | | | | 700/44 |
| 2009/0281641 | A1* | 11/2009 | Fuller | G05B 13/04 |
| | | | | 700/30 |
| 2013/0041482 | A1* | 2/2013 | Badwe | G05B 13/048 |
| | | | | 700/29 |
| 2016/0103442 | A1* | 4/2016 | Lyu | G06F 1/3206 |
| | | | | 700/291 |
| 2017/0191359 | A1* | 7/2017 | Dursun | E21B 44/06 |

FOREIGN PATENT DOCUMENTS

| | | |
|---|---|---|
| JP | 2009-193192 A | 8/2009 |
| WO | 2011/132050 A1 | 10/2011 |

OTHER PUBLICATIONS

The extended European search report dated May 2, 2017 in the counterpart European patent application.
Japanese office action (JPOA) dated Aug. 21, 2018 in a counterpart Japanese patent application.

* cited by examiner

CONTROL DEVICE, CONTROL PROGRAM, AND RECORDING MEDIUM

CROSS-REFERENCE TO RELATED APPLICATION

This application claims priority from prior Japanese Patent Application No. 2015-234260 filed with the Japan Patent Office on Nov. 30, 2015, the entire contents of which are incorporated herein by reference.

FIELD

The present invention relates to a control device that controls a control target.

BACKGROUND

Conventionally, it is known that the control device that controls a control target such as a machine performs control operation according to a disturbance or an abnormal state. The control device detects the disturbance or the abnormal state for the purpose of the control operation.

For example, in Japanese Patent Unexamined Publication No. 2004-364396 (published on Dec. 24, 2004), a state amount of control with a model (a motor or a machine is modelized) is compared to a state amount from a feedback value in operating a real machine part, and the disturbance is detected based on a comparison between a result comparison and a threshold.

In the control device of Japanese Patent Unexamined Publication No. 2004-364396, it is necessary to bring model accuracy close to the real machine in order to accurately detect the disturbance or the abnormal state. Therefore, for use of a physical simulation model, it is necessary to determine or set a parameter of a model function.

SUMMARY

An object of the present invention is to provide a control device that can accurately detect a characteristic change, the disturbance, and the abnormality with no use of the high-accuracy simulation model.

According to one aspect of the present invention, a control device for controlling a control target includes: a predictor configured to output a predictive value of an output value to an input value with respect to a model of the control target; a relational value calculator configured to calculate a relational value indicating a relationship between the predictive value and a measured value of output of the control target; and a relational value comparator configured to compare a first relational value to a second relational value, the first relational value being the relational value in a reference state in which the control target operates in a specific state, the second relational value being the relational value in an operating state in which the control target is operated.

According to the above configuration, a change of the second relational value to the first relational value can be recognized by comparing the first relational value in the reference state to the second relational value obtained in the operating state. Accordingly, a determination that some sort of change is generated in the output value of the control target can be made based on magnitude (change amount) of the change. When the first relational value is used, robustness against accuracy of the model increases because an influence of the change is included in the first relational value even for the low-accuracy model. Therefore, the model is easily produced, and the simple model can be used. Accordingly, the disturbance and the abnormal state can accurately be detected with no use of the high-accuracy model.

In the control device, the relational value comparator may compare the first relational value and the second relational value to each other by calculating a difference between the first relational value and the second relational value, and compare the difference to a predetermined threshold.

According to the above configuration, the threshold is used as a criterion for the detection of the change of the output value, and the threshold is properly set, which allows the change to be detected based on a desired reference. For example, in the control system in which the control device is incorporated, the change can be detected with the threshold corresponding to the use of the control system.

In the control device, the control target may be a mechanical part, and the input value may be a value of driving force driving the mechanical part.

When some sort of change is generated in the characteristic of the control target or when the disturbance is generated, the influence of the change or the disturbance appears as the change of the actually measured value of the output of the control target. The value of the driving force such as a torque value is corrected more quickly with strengthening feedback control. Therefore, the influence on the controlled variable is reduced, and the change of the controlled variable is hardly detected. Therefore, it is considered that the change of the torque value is observed. However, when the feedback control is weakened, the change of the torque value becomes slow, and the influence on the controlled variable appears largely. Therefore, preferably the controlled variable is observed. That is, the variable to be observed changes depending on the strength and weakness of the feedback control. The relationship between the input and the output is preferably observed control target rather than the observation of only one of the input and the output, and the relational value is used as the value indicating the relationship. Accordingly, the change can be detected with higher accuracy.

The control device may further include a change amount comparator configured to compare first change amount pattern of a change amount of the second relational value to the first relational value in setting the measured value for a specific parameter to a value different from a normal value to a second change amount pattern of a change amount of the second relational value to the first relational value in the operating state of the control target.

According to the above configuration, which one of the parameter is changed in the characteristic can be recognized based on which one of the parameters, such as a viscous friction coefficient and inertia moment, of the first change amount pattern is close to the second change amount pattern.

The control device may further include a margin calculator configured to calculate a margin indicating a degree of margin of the second relational value to a permissible limit at which the difference between the first relational value and the second relational value reaches the threshold.

According to the above configuration, how much the pattern reaches the permissible limit can be recognized by calculating the margin. Therefore, a temporal margin to a limit necessary for maintenance of the control target can approximately be understood.

The control device of the present invention may be constructed with a computer. In this case, a control program that operates the computer as each part (software element) of the control device to construct the control device and a computer-readable recording medium in which the control program is recorded are also included in the scope of the present invention.

In the present invention, the disturbance and the abnormal state can accurately be detected with no use of the high-accuracy simulation model.

DETAILED DESCRIPTION

First Embodiment

A first embodiment of the present invention will be described below with reference to FIGS. 1 to 7.

Outline of Control System 100

Figure 1:
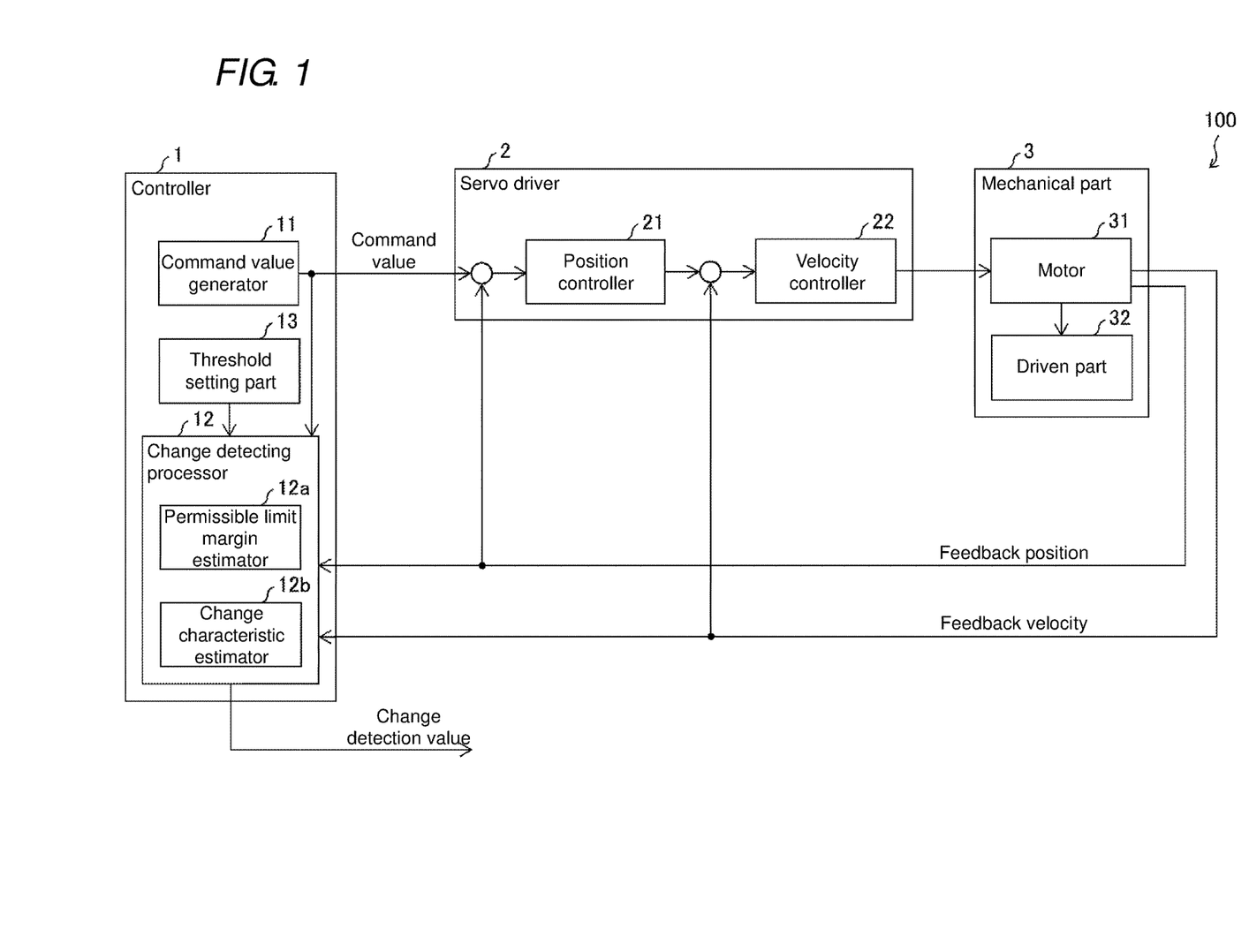
FIG. 1 is a block diagram illustrating a schematic configuration of a control system according to a first embodiment of the present invention.

FIG. 1 is a block diagram illustrating a schematic configuration of a control system 100 of the first embodiment.

As illustrated in FIG. 1, the control system 100 includes a controller 1, a servo driver 2, and a mechanical part 3.

The mechanical part 3 is a control target of the controller 1, and includes a motor 31 and a driven part 32. For example, the motor 31 that drives the driven part 32 is a servo motor. A rotary encoder that detects a rotation angle and an angular velocity is attached to a rotating shaft of the motor 31. The driven part 32 is a portion that is driven in a machine such as a robot, and the driven part 32 includes a mechanism that converts rotation driving power generated with the motor 31 into predetermined motion.

Based on a command received from the controller 1, the servo driver 2 provides a torque as optimum driving energy according to the state amount (such as a rotation angle and an angular velocity) of the motor 31, thereby driving the motor 31. In the case that the servo driver 2 is included in a later-described control target model, the servo driver 2 is the control target of the controller 1.

The servo driver 2 includes a position controller 21 and a velocity controller 22 as the control system. The position controller 21 performs position control (P control) based on feedback position (rotation angle) output from the motor 31 and a command value from the controller 1. The velocity controller 22 performs velocity control (PI control) based on a feedback velocity (angular velocity) output from the motor 31 and a control pulse from the position controller 21.

The controller 1 is a control device that generates a control command value provided to the servo driver 2, and the controller 1 is constructed with a programmable controller. The controller 1 includes a command value generator 11 that generates the command value based on an externally-provided command value pattern. The controller 1 has a function of detecting some sort of change generated in the servo driver 2 or the mechanical part 3, and includes a change detecting processor 12 and a threshold setting part 13 in order to implement the function.

The change detecting processor 12 performs a controlled variable prediction calculation (simulation) using a control target model, and monitors a change amount of a prediction error (relational value) from a reference state (a state in which the control target is normally operated (also called a state in which the characteristic change or the disturbance is not generated in the control target)), the change amount being a difference between the predictive value obtained from a simulation result and an actually-measured controlled variable (a feedback value, a measured value). Then, the change detecting processor 12 detects a controlled variable change (a change including the characteristic change and the disturbance) based on the change amount. More specifically, the change detecting processor 12 obtains a pattern for one cycle of a reference characteristic prediction error that is the prediction error of the characteristic (reference characteristic) in a reference state as a teacher pattern, and detects the change when the change amount is larger than a predetermined threshold. The change amount is a ratio of the prediction error based on the controlled variable obtained in a normal operating state of a real machine (the servo driver 2 and the mechanical part 3) to the reference characteristic prediction error of the teacher pattern. Examples of the control target model include a composite model in which a combination of the servo driver 2 and the mechanical part 3 are modelized and a mechanism model in which only the mechanical part 3 is modelized.

The change detecting processor 12 includes a permissible limit margin estimator 12a (margin calculator) and a change characteristic estimator 12b (change amount comparator). The permissible limit margin estimator 12a estimate a margin for a permissible limit until the change detecting processor 12 detects the change based on a prediction error change amount. The change characteristic estimator 12b estimates a type of a characteristic (parameter) that is changed when the change detecting processor 12 detects the change based on the prediction error change amount.

In the first embodiment, the change detecting processor 12 detects the change using the prediction error as an index (relational value) expressing a relationship between the predictive value and the measured value. However, the index is not limited to the prediction error. For example, a ratio of the predictive value and the measured value may be used as the index.

The threshold setting part 13 sets the threshold. The threshold setting part 13 sets the threshold based on the prediction error change amount obtained in the state in which the servo driver 2 and the mechanical part 3 are operated (first threshold setting method). Alternatively, the threshold setting part 13 sets the threshold based on the prediction error change amount that is obtained by simulation with the control target model (second threshold setting method).

Control Target Model

For example, a whole model and an individual model can be cited as a model during the simulation of the control target.

The whole model is represented by a discrete time transfer function indicated in Equation (1). In Equation (1), although each parameter has no physical meaning, a coefficient is properly determined such that the characteristics are matched with each other as a whole. In Equation (1), u indicates input, y indicates output, d, $a_1$ to $a_n$, and $b_1$ to $b_m$ indicates a characteristic parameter, and $z^{-1}$ indicates a delay operator.

$$y = z^{-d} \frac{b_1 z^{-1} + b_2 z^{-2} + \ldots + b_m z^{-m}}{1 + a_1 z^{-1} + a_2 z^{-2} + \ldots + a_n z^{-n}} u \quad (1)$$

However, as described later, the individual model including a parameter having a clear physical meaning is required in the case that the change characteristic estimator 12b previously obtains the prediction error change amount during the characteristic change by the simulation. The following model can be cited as an example of the individual model.

In an example of the rotation velocity of the motor 31, a velocity y is represented by Equation (2). In Equation (2), u is a torque, J is inertia moment, and D is a viscous friction coefficient.

$$y = \frac{1}{Js + D} u \quad (2)$$

In an example of a liquid temperature in a tank, temperature y is represented by Equation (3). In Equation (3), u is an applied amount of heat, v is a volume, $\rho$ is density, C is specific heat, and W is an inflow and an outflow.

$$y = \frac{1}{V\rho Cs + CW} u \quad (3)$$

In the case that the whole model is the discrete time transfer function, the predictive value y at a sampling time point k is calculated using Equation (4) obtained by deforming Equation (1). In Equation (1), $z^{-1}$ indicates data before one cycle. The change detecting processor 12 calculates y(k) as a kth position by a combination of data in which a coefficient is multiplied by past positional information (y(k−1), y(k−2), . . . ) and some pieces of past positional information about the input (the output when viewed from the controller 1) as the control target. In the case that the calculated predictive value differs from the feedback value, a difference between the predictive value and the feedback value becomes the prediction error at that time point.

$$y(k) = -a_1 y(k-1) - a_2 y(k-2) - \ldots - a_n y(k-n) + b_1 u(k-1-d) + b_2 u(k-2-d) + \ldots + b_m u(k-m-d) \quad (4)$$

Operation of Controller 1

Operation of the controller 1 in the control system 100 having the above configuration will be described below.

Operation of Threshold Setting Part 13

The operation of the threshold setting part 13 will be described.

(1) First Threshold Setting Method

Figure 2:
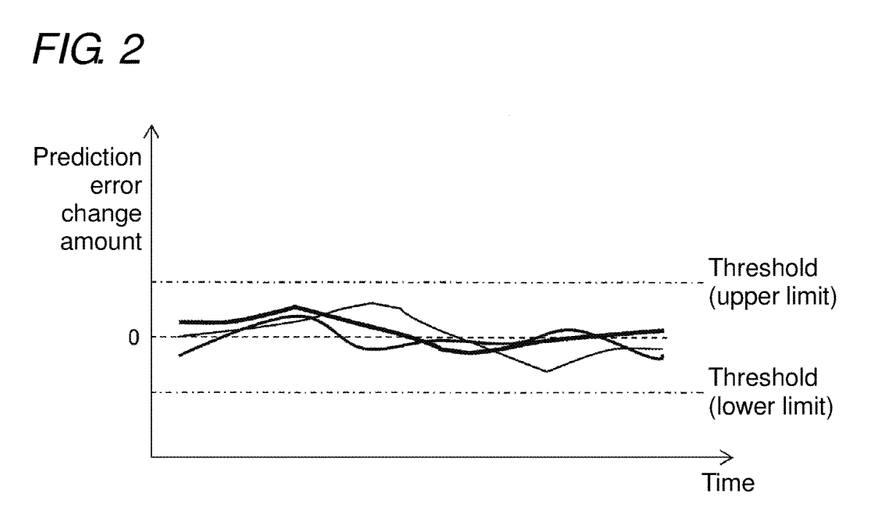
FIG. 2 is a view illustrating a first threshold setting method performed with a threshold setting part included in a controller of the control system.

FIG. 2 is a view illustrating the first threshold setting method performed with the threshold setting part 13.

After the teacher pattern is determined, the threshold setting part 13 acquires the controlled variable (feedback value), which is measured when the controller 1 operates the real machine (the servo driver 2 and the mechanical part 3) in the reference state several times, and sets the threshold including a margin based on a variation in change amount (prediction error change amount) of the prediction error based on these controlled variables to the teacher pattern. More specifically, as illustrated in FIG. 2, the threshold setting part 13 sets a value in which a given ratio (for example, 120%) is multiplied by each of a maximum value and the minimum value of a prediction error change amount to the threshold (an upper limit and a lower limit).

The threshold setting part 13 may set the threshold by multiplying a given ratio by only one of the maximum value and the minimum value of the prediction error change amount. The teacher pattern obtained at an initial time when the real machine is operated several times may be adopted as the teacher pattern to be stored, and preferably average values of the teacher patterns obtained by several operations is adopted as the teacher pattern to be stored. The predictive value is calculated every time the real machine is operated, and the prediction error that is the difference between the predictive value and the controlled variable is also calculated. That is, every time the real machine is operated, it is necessary to acquire not only the controlled variable that is the control target but also the torque value or the command value to the servo driver 2, which is the input to the control target.

Although the change amount of the prediction error is slightly generated due to a factor of repetitive accuracy, basically the change amount of the prediction error is a value close to zero. Accordingly, the threshold is set to a value close to zero.

Because the measured value of the controlled variable in the reference state includes a variation (measurement noise), the controlled variable obtained by several operations is required. The prediction error becomes zero when the measurement noise is not generated while the control target model is complete. Actually, the controlled variable obtained by several operations varies because the controlled variable includes some sort of measurement noise. In consideration of the variation in controlled variable, the threshold is set with a small margin. When the characteristic change of the real machine or the disturbance is generated, the prediction error change amount exceeds the threshold set as described above. It is also considered that the minute disturbance (at a level it seems to be no problem) is stationarily input even if the measurement noise is absent. Accordingly, it is necessary to obtain the prediction error change amount several times as a countermeasure against such cases.

In the operation of the real machine within a range of the command value, an influence of a non-linear characteristic having reproducibility or interference from another axis (another control loop) is included in the reference state.

In the case that a common threshold is set to plural machines of facilities having the identical characteristic, although the common control target model may be used, it is necessary to recognize a variation in prediction error change amount based on the controlled variable, the torque value, or the command value to the servo driver 2 of the plural machines of facilities.

The threshold setting method is effectively adopted in all the changes including a sudden change and a gentle change that is not included in the reference state. Examples of the sudden change include a malfunction, component exchange, or adjustment of the mechanical part 3 and parameter adjustment of the servo driver 2. Degradation over time of the mechanical part 3 can be cited as an example of the gentle change.

(2) Second Threshold Setting Method

Figure 3:
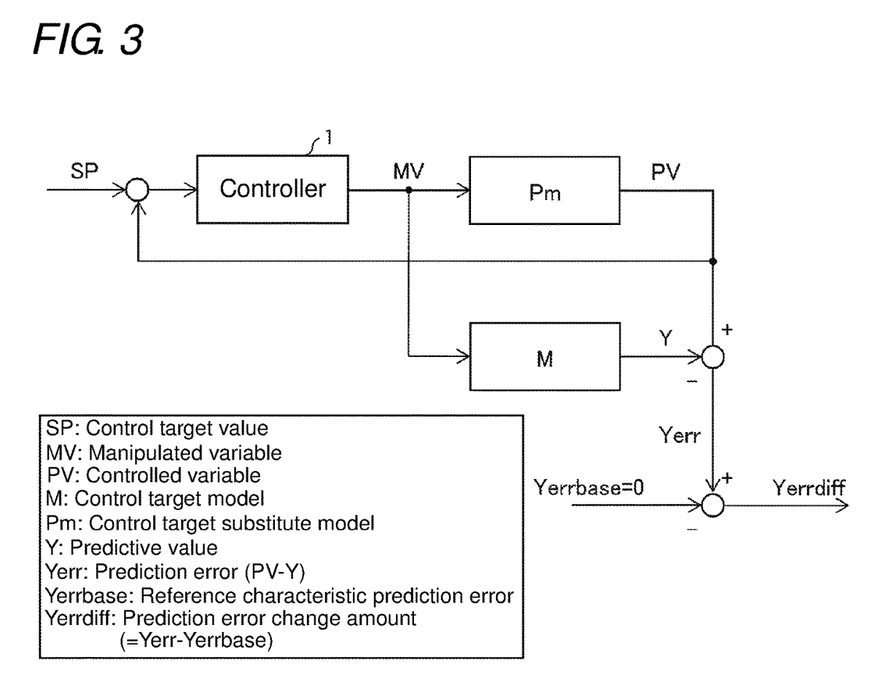
FIG. 3 is a view illustrating simulation for a second threshold setting method performed with the threshold setting part.
Figure 4:
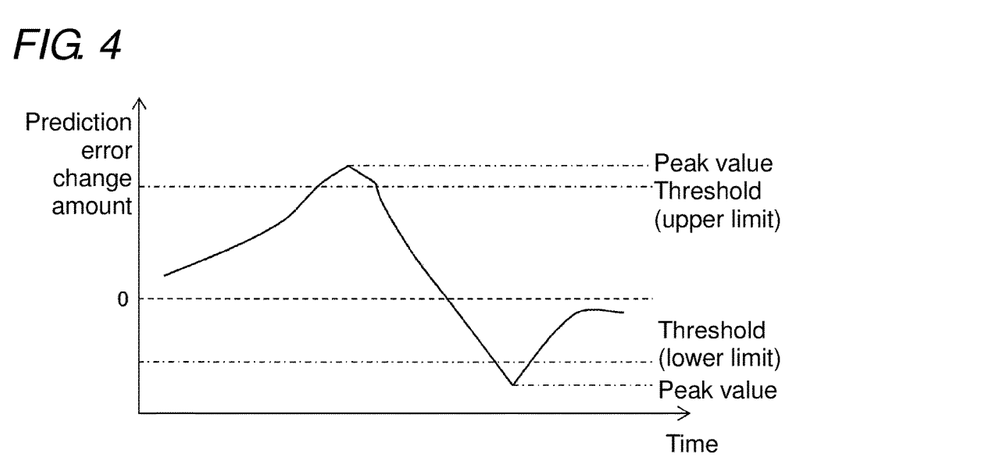
FIG. 4 is a view illustrating the second threshold setting method.

FIG. 3 is a view illustrating the simulation for the second threshold setting method performed with the threshold setting part 13. FIG. 4 is a view illustrating the second threshold setting method.

As illustrated in FIG. 3, the threshold setting part 13 sets the threshold by the simulation performed using a real control target substitute model Pm and a control target model M. The real control target substitute model Pm is a control target model for the real machine. The control target model M is a virtual model for the control target, and is used in simulation for a variation system.

The simulation is basically performed in the following procedure. Based on a provided control target value SP (command value pattern), the controller 1 generates a manipulated variable MV (command value), and provides the manipulated variable MV to the real control target substitute model Pm and the control target model M. The control target model M outputs a predictive value Y, and the real control target substitute model Pm outputs a controlled variable PV. The controlled variable PV is fed back to the input of the controller 1. The prediction error Yerr (second relational value) is obtained by subtracting the predictive value Y from the controlled variable PV, and the prediction error change amount Yerrdiff is obtained by subtracting a reference characteristic prediction error Yerrbase (first relational value) from a prediction error Yerr.

Assuming that the control target substitute model Pm and the control target model M are equivalent to each other in the state in which the characteristic does not change, when the threshold setting part 13 performs the simulation, the prediction error Yerr and the prediction error change amount Yerrdiff become zero in a whole interval. In this case, because the simulation is identical to the production of the teacher pattern, the simulation may be eliminated.

The threshold setting part 13 performs the simulation in the above procedure on the real control target substitute model Pm1 in which the characteristic of the real control target substitute model Pm is changed by a permissible value of the characteristic change of the real machine. As illustrated in FIG. 4, the threshold setting part 13 sets a value a given ratio (for example, 90%) is multiplied by each of peak values (the maximum value and the minimum value) of the prediction error change amount Yerrdiff as the threshold (the upper limit and the lower limit) such that the peak value can be detected in the whole interval of the prediction error change amount Yerrdiff obtained by the simulation. The threshold setting part 13 may set the threshold by multiplying a given ratio by only one of the maximum value and the minimum value of the prediction error change amount Yerrdiff.

Operation of Change Detecting Processor 12

The operation of the change detecting processor 12 will be described below.

For the composite model, the value input to the change detecting processor 12 is the command value output from the command value generator 11. On the other hand, for the mechanism model, the value input to the change detecting processor 12 is the value (torque value) of the torque (driving force) provided from the servo driver 2 to the motor 31.

In the initial mode, the change detecting processor 12 previously stores the reference characteristic prediction error Yerrbase (teacher pattern) for one cycle of the control by performing the simulation in FIG. 3.

In the normal mode in which the real machine is normally operated, the controller 1 repeatedly performs the identical control operation on the mechanical part 3 based on a constant command value. The change detecting processor 12 calculates the predictive value Y for the input value (manipulated variable MV), and obtains the prediction error Yerr by subtracting predictive value Y from the feedback value (controlled variable PV) input from the servo driver 2 or the mechanical part 3 in each control cycle (one cycle).

The change detecting processor 12 obtains the prediction error change amount Yerrdiff by subtracting the reference characteristic prediction error Yerrbase from the prediction error Yerr. At this point, the reference characteristic prediction error Yerrbase obtained at the same time point as the time point the prediction error Yerr obtained in one cycle is used in the subtraction. The prediction error Yerr increases and decreased depending on the model accuracy, the command value pattern (a pattern in which the command value increases easily at a place of large acceleration), and interference received from another control loop operation. However, on the condition in the identical operating cycle, it is considered that the prediction error Yerr having the identical magnitude is generated at an identical clock time (an elapsed time since a cycle starting time point). Therefore, the difference between the prediction error Yerr and the reference characteristic prediction error Yerrbase is calculated at the identical clock time in the cycle.

The change detecting processor 12 compares the prediction error change amount Yerrdiff to the threshold set with the threshold setting part 13. The change detecting processor 12 detects the change when determining that the prediction error change amount Yerrdiff is larger than the threshold, and does not detect the change when determining that the prediction error change amount Yerrdiff is less than or equal to the threshold.

As described above, the change detecting processor 12 obtains the difference between the prediction error Yerr and the prediction error change amount Yerrdiff, which are obtained at a specific time point. Alternatively, for example, the change detecting processor 12 may obtain the difference between the prediction error Yerr and the prediction error change amount Yerrdiff by determining a degree of similarity of the time-series data from the starting of one cycle through various pieces of statistical processing.

In the above example, the operation pattern detecting the change is defined as one cycle of the control. Alternatively, the operation pattern may be a specific process in a continuous operation or a given cycle in which some sort of trigger signal is used as a starting point.

Operation of Permissible Limit Margin Estimator 12a

Figure 5:
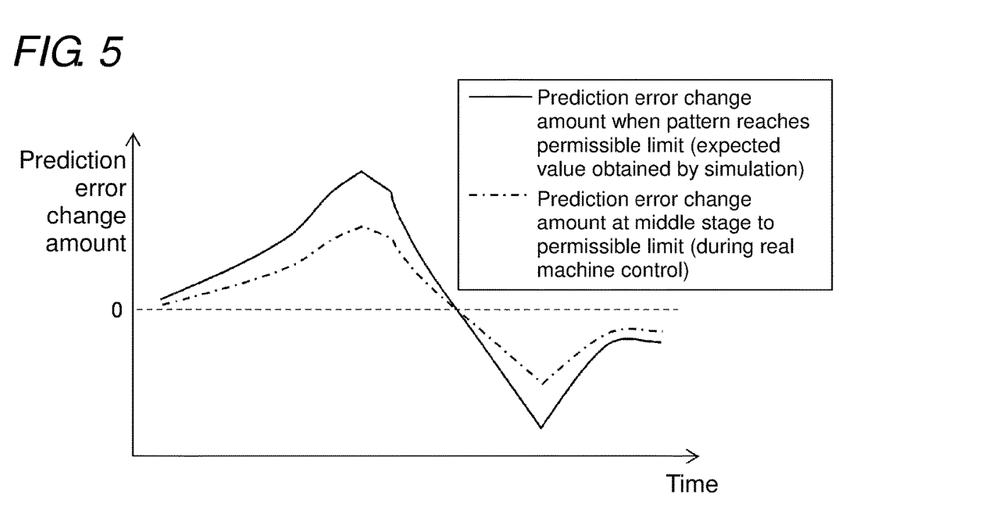
FIG. 5 is a graph illustrating a margin for a permissible limit of a control target change detected with the controller.

The presence of the control target change is detected in the change detecting operation performed with the change detecting processor 12. Additionally, the margin for the permissible limit at which the change is detected can also be indicated. The permissible limit margin estimator 12a uses the prediction error change amount Yerrdiff, which is obtained by changing the characteristic of the real control target substitute model Pm to the real control target substitute model Pm1 by the second threshold setting method, as the prediction error change amount during the permissible limit characteristic. FIG. 5 is a graph illustrating the margin for the permissible limit of the control target change detected with the controller 1.

The prediction error change amount at a middle stage to the permissible limit indicated by an alternate long and short dash line in FIG. 5 becomes a value between the reference state of zero and the prediction error change amount in reaching the permissible limit indicated by a solid line in FIG. 5. That is, in FIG. 5, the prediction error change amount is close to the permissible limit when the pattern of the current prediction error change amount comes close to the pattern of the prediction error change amount in reaching the permissible limit, and the permissible limit has a margin when the pattern of the current prediction error change amount separates from the pattern of the prediction error change amount in reaching the permissible limit. The degree of margin (margin) is obtained by a ratio between an area (first area) to the pattern of zero of the prediction error change amount in reaching the permissible limit and an area (second area) to the pattern of zero of the current prediction error change amount.

The permissible limit margin estimator 12a calculates the margin based on the following equation. In the following equation, A indicates a total sum (first area) of absolute values of the prediction error change amount in reaching the permissible limit, and B indicates a total sum (second area) of absolute values of the prediction error change amount.

Margin=$(A-B)/A*100$ (%)

Thus, how much the pattern reaches the permissible limit can be recognized by obtaining the margin for which the prediction error change amount reaches the permissible limit. Therefore, the temporal margin to the limit necessary for the maintenance of the servo driver 2 and the mechanical part 3 can approximately be understood.

Operation of Change Characteristic Estimator 12b

The control target model includes parameters of some characteristics such as a viscous friction characteristic (D) and inertia moment (J). When the change of only the specific parameter (for example, the viscous friction characteristic (D) or the inertia moment (J)) is previously determined, how much the parameter is changed can be predicted by comparing the teacher pattern to the pattern of the prediction error change amount during the operation.

The change characteristic estimator 12b previously obtains some patterns (individual-characteristic prediction error change amount pattern) of the prediction error change amount with respect to different characteristics by the second threshold setting method when only the specific characteristic of the real control target substitute model Pm in FIG. 3 is changed alone. The change characteristic estimator 12b compares the prediction error change amount pattern obtained during the operation of the real machine to plural individual-characteristic prediction error change amount patterns, and determines the individual characteristic prediction error change amount pattern closest to the prediction error change amount pattern during the operation of the real machine.

For example, in the velocity control of the motor 31, the relationship between the torque and the velocity is represented by $1/(Js+D)$ using the inertia moment J and the viscous friction coefficient D. The change characteristic estimator 12b performs the simulation in the case that inertia moment Jpm changes in the characteristic of the real control target substitute model Pm and the case viscous friction coefficient Dpm changes, and stores the individual-characteristic prediction error change amount pattern (first change amount pattern) obtained by each simulation. The change characteristic estimator 12b compares the prediction error change amount pattern (second change amount pattern) during the real machine control to the two individual-characteristic prediction error change amount pattern, and determines which one of the individual-characteristic prediction error change amount patterns is closer to the prediction error change amount pattern during the real machine control or whether the prediction error change amount pattern during the real machine control is a combination of the two individual-characteristic prediction error change amount patterns, thereby estimating how much the determined characteristic is changed.

Figure 6:
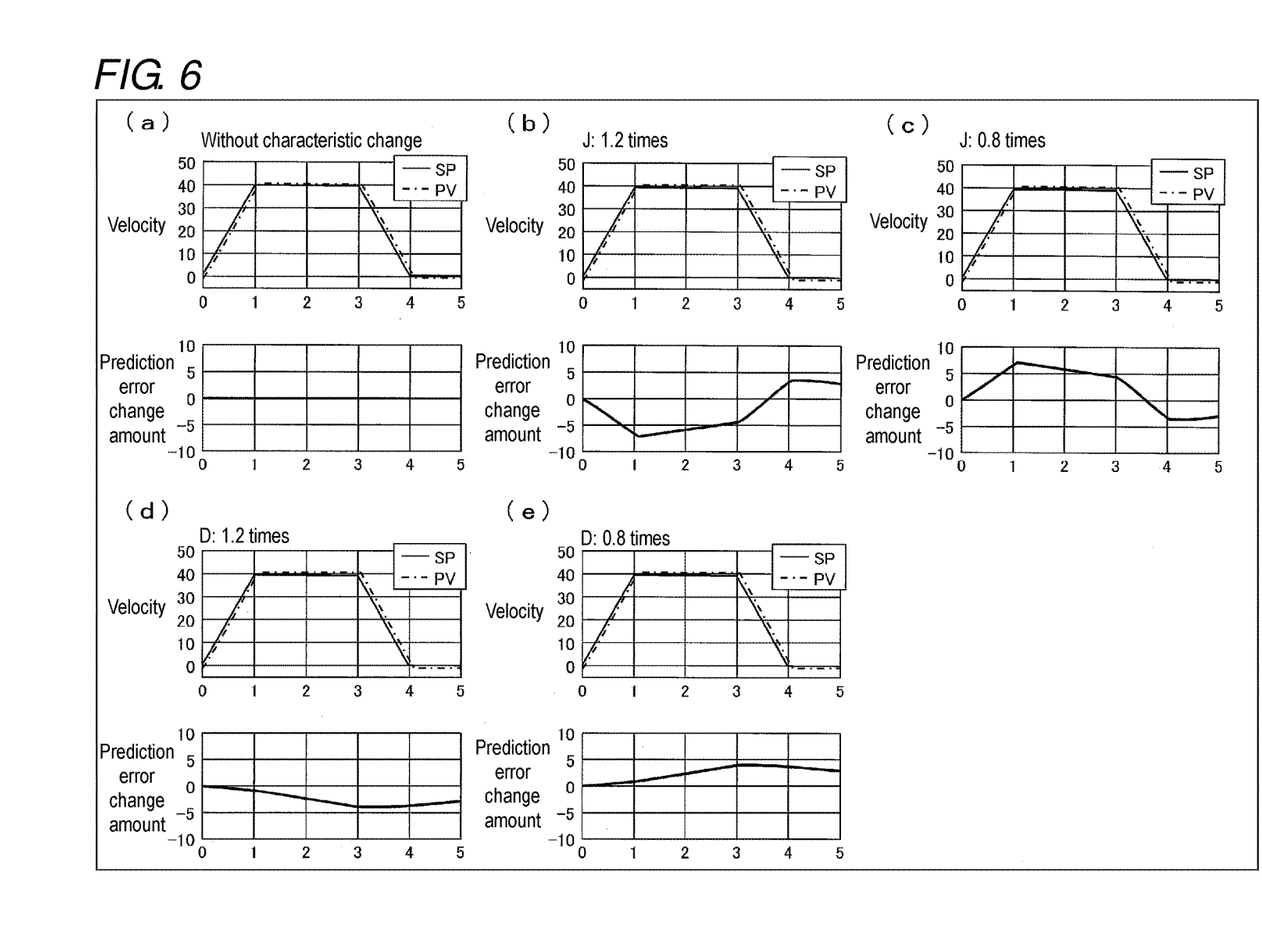
FIG. 6 is a view illustrating an example of presence of a characteristic change.

FIG. 6 is a view illustrating examples of the present of the characteristic change when the servo driver 2 (only a velocity control loop) and the mechanical part 3 are set to the control target. As illustrated in graph (a) of FIG. 6, in the case that the characteristic is not changed, the prediction error change amount becomes zero when the controlled variable PV of the velocity is substantially equal to the control target value SP of the velocity. On the other hand, for example, as illustrated in graph (b) of FIG. 6, the prediction error change amount changes largely when the inertia moment J changes so as to be large with respect to the reference characteristic (1.2 times). As illustrated in graph (c) of FIG. 6, when the inertia moment J changes so as to be small with respect to the reference characteristic (0.8 times), the prediction error change amount changes in an opposite direction to the case that the inertia moment J changes largely with respect to the reference characteristic. As illustrated in graph (d) of FIG. 6, the prediction error change amount changes gently when the viscous friction coefficient D changes so as to be large with respect to the reference characteristic (1.2 times). As illustrated in graph (e) of FIG. 6, when the viscous friction coefficient D changes so as to be small with respect to the reference characteristic (0.8 times), the prediction error change amount changes in an opposite direction to the case that the viscous friction coefficient D changes largely with respect to the reference characteristic. The change direction depends on the command value.

Effect of Controller 1

Effect of Change Detection

In order to detect some sort of change generated in the feedback value, the determination that some sort of characteristic change is detected may be made when the prediction error is larger than a predetermined reference value. However, in the case that a predetermined command value is repeatedly provided to the servo driver 2, it is preferable that the controller 1 detects the change. Specifically, the prediction error Yerr for one cycle in the state in which the change is generated is stored as the reference characteristic prediction error Yerrbase, the stored reference characteristic prediction error Yerrbase is compared to the prediction error Yerr obtained in the normal mode, and the detection of the change is determined when the difference (prediction error change amount Yerrdiff) between the reference characteristic prediction error Yerrbase and the prediction error Yerr is larger than the threshold (reference value).

Accordingly, the controller 1 can detects some sort of change in real time when an environment of the mechanical part 3 or the characteristic of the mechanical part 3 changes, or when the disturbance is suddenly generated. Therefore, it is not necessary that the data is analyzed with a computer to detect the change.

Because the teacher pattern includes the acceleration pattern in the command pattern and the influence between the control loops (or axes), it is not necessary to consider the acceleration or the influence of the interference in determining the threshold. Therefore, the setting of a predetermined threshold is enough to detect the change.

The robustness against the accuracy of the model increases because the influence of the change is included in the teacher pattern even for the low-accuracy model. Therefore, the model is easily produced, and the simple model can be used. Accordingly, the disturbance and the abnormal state can accurately be detected with no use of the high-accuracy model. Additionally, a simulation calculation load can be reduced.

Meaning of Use of Prediction Error

Figure 7:
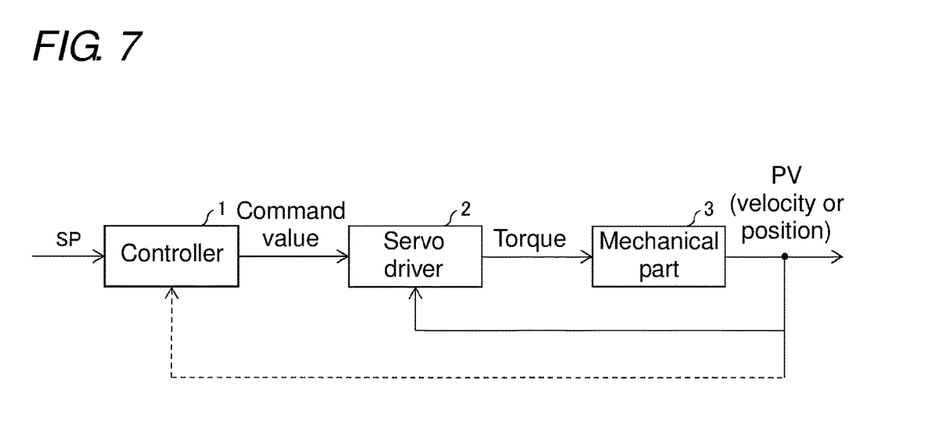
FIG. 7 is a view illustrating a meaning a prediction error is used in the control system.

The meaning of the use of the prediction error in the control system 100 will be described below. FIG. 7 is a view illustrating the meaning of the use of the prediction error.

When the disturbance of the control target is generated, the influence of the disturbance appears as the change of the controlled variable PV. However, as illustrated in FIG. 7, the feedback control from the mechanical part 3 to the servo driver 2 acts to immediately eliminate the change of the controlled variable PV. Because the trend becomes remarkable as the feedback control is strengthened, the change is hardly detected based on the controlled variable PV. In FIG. 7, sometimes the feedback from the controlled variable PV to the controller 1 is performed, and sometimes the feedback is not performed.

The torque value is corrected more quickly with strengthening feedback control. Therefore, the influence on the controlled variable is reduced, and the change of the controlled variable is hardly detected. Therefore, it is considered that the change of the torque value is observed. However, when the feedback control is weakened, the change of the torque value becomes slow, and the influence on the controlled variable appears largely. Therefore, preferably the controlled variable is observed. That is, the variable to be observed changes depending on the strength and weakness of the feedback control. The relationship between the input and the output is preferably observed control target rather than the observation of only one of the input and the output, and the relational value is used as the value indicating the relationship. Accordingly, the change can be detected with higher accuracy.

Second Embodiment

A second embodiment of the present invention will be described below with reference to FIG. 8. In the second embodiment, the component having the function equivalent to the component of the first embodiment is designated by the identical numeral, and the description is omitted.

Configuration of Controller 1A

Figure 8:
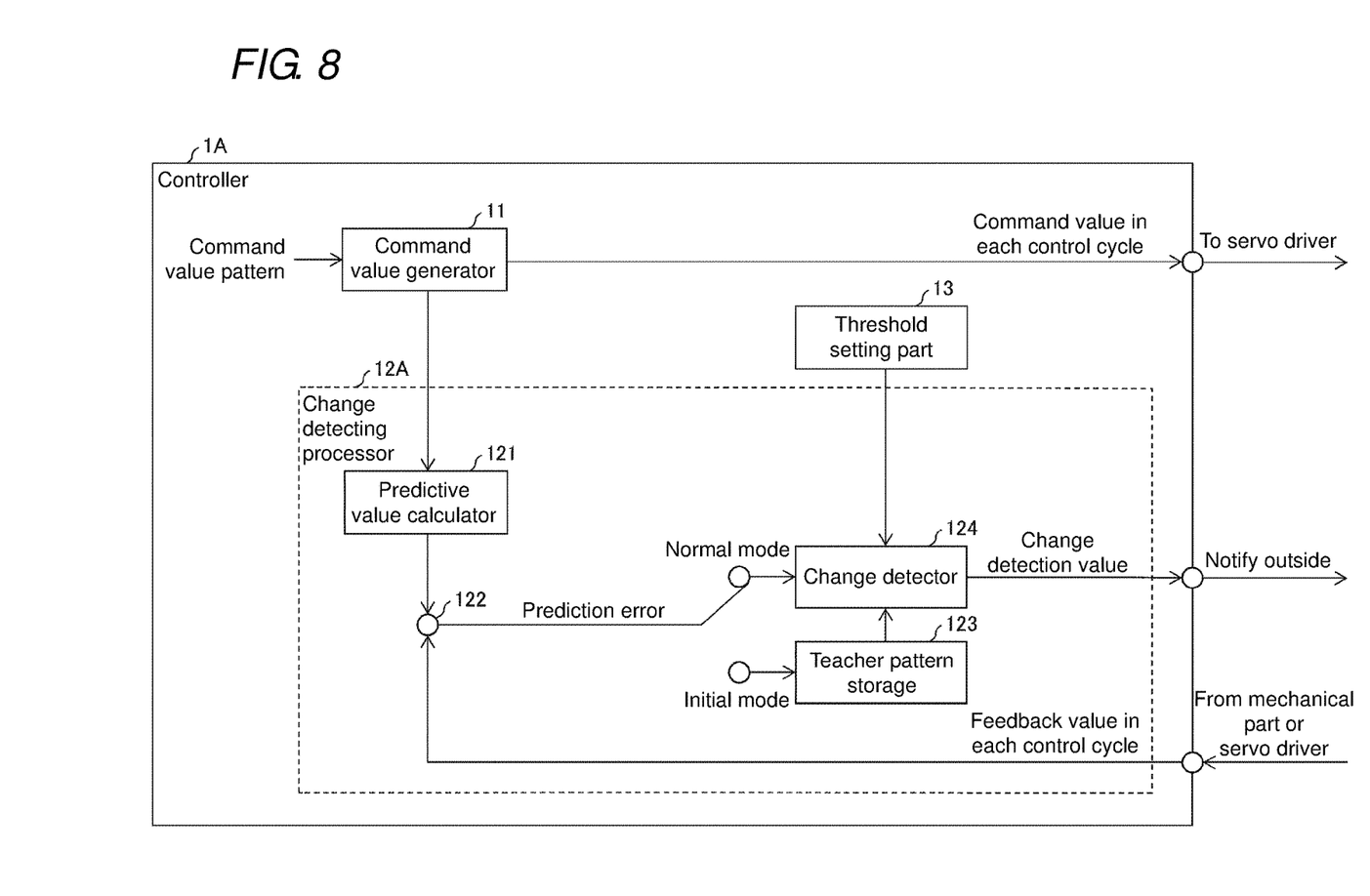
FIG. 8 is a block diagram illustrating a configuration of a controller according to a second embodiment of the present invention.

FIG. 8 is a block diagram illustrating a configuration of a controller 1A of the second embodiment.

Although the controller 1A includes a basic function common to the controller 1 of the first embodiment, the controller 1A is configured so as not to perform the feedback control. In the second embodiment, a change detecting processor 12A of the controller 1A will be described in detail. As illustrated in FIG. 8, the change detecting processor 12A of the controller 1A includes a predictive value calculator 121 (predictor), a prediction error calculator 122 (relational value calculator), a teacher pattern storage 123, and a change detector 124 (relational value comparator).

As described above, the predictive value calculator 121 calculates the predictive value by the simulation based on the command value. As described above, the prediction error calculator 122 calculates the prediction error by subtracting the predictive value from the controlled variable PV. The pattern for one cycle of the prediction error (reference characteristic prediction error) calculated in the initial mode (reference state) is stored in the teacher pattern storage 123 as the teacher pattern. The change detector 124 calculates the change amount by subtracting the reference characteristic prediction error in timing of obtaining the prediction error in the teacher pattern from the prediction error obtained in the normal mode, and detects the change when the change amount is larger than the threshold set with the threshold setting part 13.

Operation of Controller 1A

The command value generator 11 calculates the command value from the command value pattern in each control cycle, and provides the command value to the servo driver and the predictive value calculator 121. The predictive value calculator 121 obtains the predictive value by the simulation based on the command value.

In the initial mode, the prediction error calculator 122 calculates the reference characteristic prediction error from the feedback value (controlled variable PV) returned from the servo driver 2 and the predictive value, and stores the pattern of the reference characteristic prediction error as the teacher pattern.

In the normal mode, the prediction error calculator 122 calculates the prediction error of the difference between the predictive value and the feedback value, and provides the prediction error to the change detector 124. The change detector 124 compares the provided prediction error to the teacher pattern to obtain the prediction error change amount, detects the change when the prediction error change amount is larger than the threshold, and outputs the change detection value indicating the detection.

The teacher pattern is obtained while the real machine (particularly, the mechanical part 3 in a brand new state) is operated, and the degradation over time can be detected when the prediction error change amount is larger than the threshold.

In the case that the changes of some characteristics are detected, the change detector 124 determines which one of the changed characteristics is close to the characteristic using the prepared teacher pattern. In the case that only one characteristic to be detected is specified, one teacher pattern corresponding to the characteristic is prepared.

Third Embodiment

A third embodiment of the present invention will be described below with reference to FIG. 9. In the third embodiment, the component having the function equivalent to the component of the first and second embodiments is designated by the identical numeral, and the description is omitted.

Configuration of Controller 1B

Figure 9:
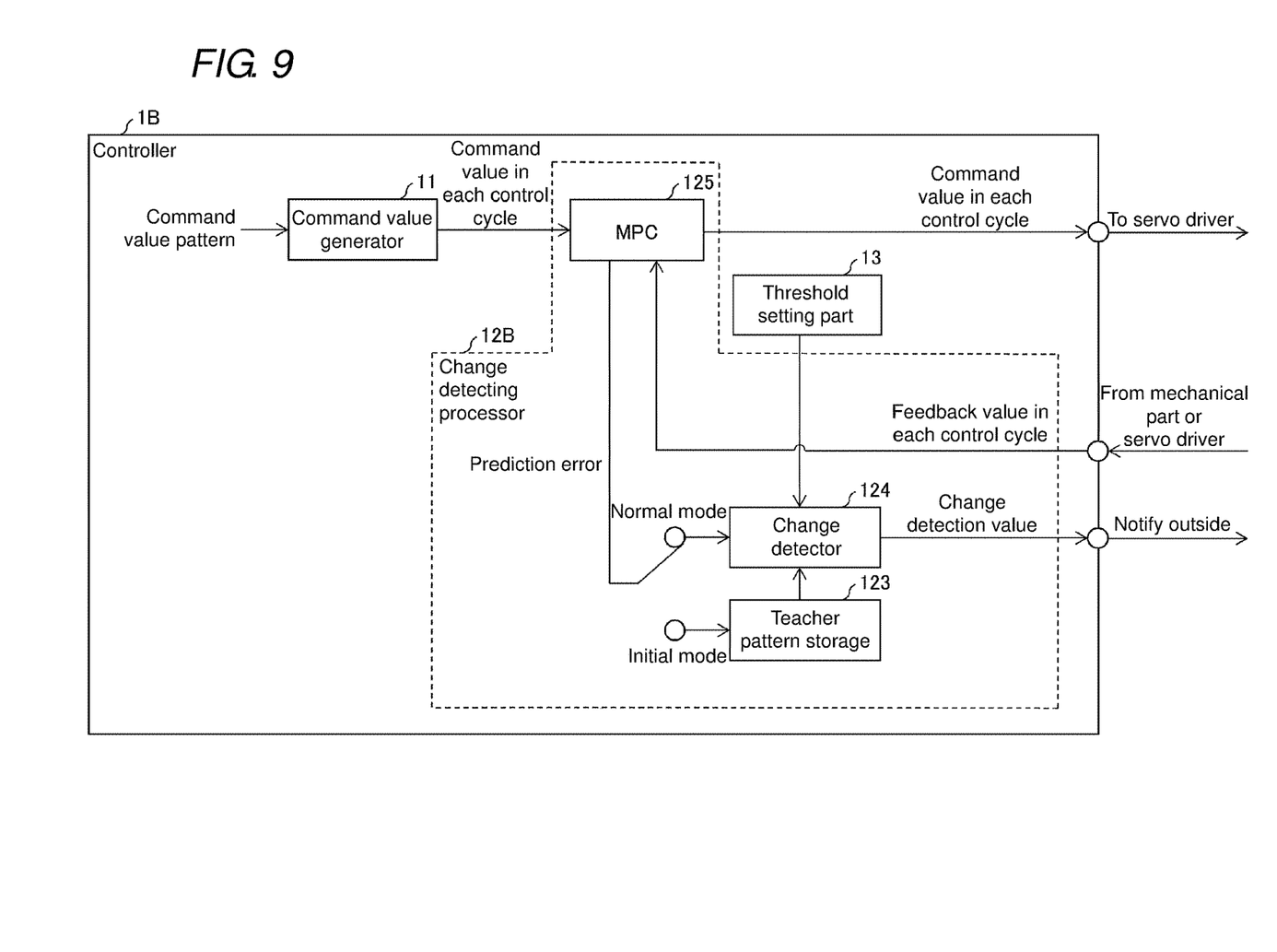
FIG. 9 is a block diagram illustrating a configuration of a controller according to a third embodiment of the present invention.

FIG. 9 is a block diagram illustrating a configuration of a controller 1B of the third embodiment.

Although the controller 1B includes the basic function common to the controller 1 of the first embodiment, the controller 1B is configured to perform the model-based feedback control. In the third embodiment, a change detecting processor 12B of the controller 1B will be described in detail. As illustrated in FIG. 9, the change detecting processor 12B of the controller 1B includes the teacher pattern storage 123, the change detector 124, and a model predictive control (MPC) part 125.

The MPC part 125 performs model predictive control in which the control is performed while a future behavior is predicted by a prediction model. The MPC part 125 performs the feedback control using the feedback value from the mechanical part 3 or the servo driver 2, and outputs some sort of command value (the position, the velocity, and the torque) to the servo driver 2. Similarly to the predictive value calculator 121, the MPC part 125 calculates the predictive value based on the command value.

In the case that the controller 1B performs the model-based feedback control, the MPC part 125 calculates the prediction error, so that the prediction error can be used in the storage of the teacher pattern and the detection of the change.

Fourth Embodiment

A fourth embodiment of the present invention will be described below with reference to FIG. 10. In the fourth embodiment, the component having the function equivalent to the component of the first and second embodiments is designated by the identical numeral, and the description is omitted.

Figure 10:
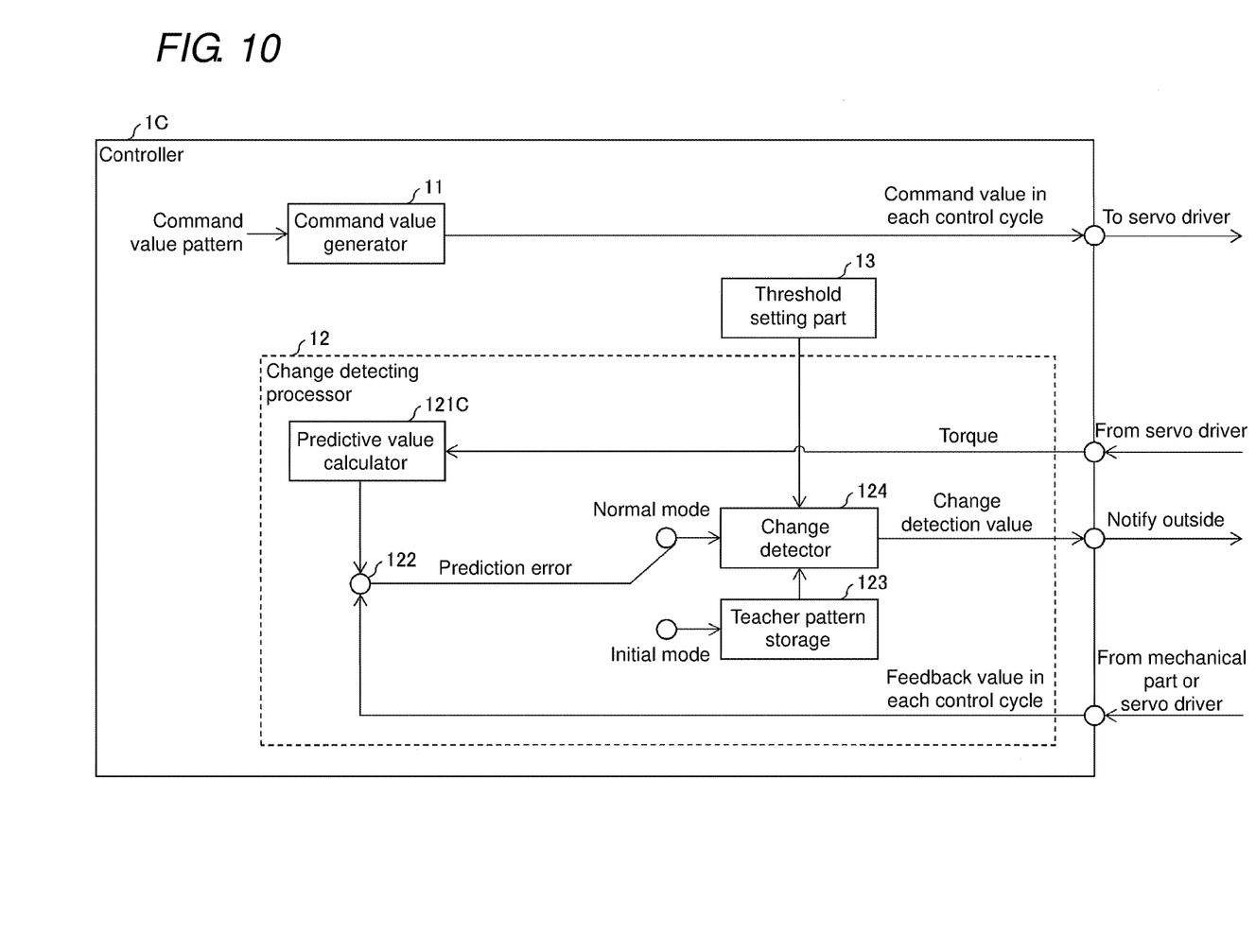
FIG. 10 is a block diagram illustrating a configuration of a controller according to a fourth embodiment of the present invention.

FIG. 10 is a block diagram illustrating a configuration of a controller 1C of the fourth embodiment.

Although the controller 1C includes the basic function common to the controller 1 of the first embodiment, the controller 1C is configured to be compatible with the control target model (mechanism model) only for the mechanical part 3. In the fourth embodiment, a change detecting processor 12C of the controller 1C will be described in detail. As illustrated in FIG. 10, the change detecting processor 12 of the controller 1C includes a predictive value calculator 121C, the prediction error calculator 122, the teacher pattern storage 123, and the change detector 124. Unlike the predictive value calculator 121 of the change detecting processor 12A, the predictive value calculator 121C calculates the predictive value by the simulation based on the torque value input from the servo driver 2.

The controller 1C having the above configuration differs from the controller 1A in that the command value does not the input value but the output value (torque value) from the servo driver 2 to the mechanical part 3 becomes the input for the prediction. The predictive value calculator 121C calculates the predictive value based on the torque value. The prediction error calculator 122 produces the teacher pattern using the value experienced through the model (mechanical part 3) and the measured value.

Implementable Example by Software

The control block (particularly, the command value generator 11, the change detecting processor 12, and the threshold setting part 13) of the controllers 1, and 1A to 1C may be constructed with a logic circuit (hardware) formed in an integrated circuit (IC chip), or implemented by software using a central processing unit (CPU).

In the latter case, the controllers 1 and 1A to 1C include a CPU that executes a command of control the program that is of software implementing a function of each part, a read only memory (ROM) or a storage device (referred to as a "recording medium") in which the program and various pieces of data are readably stored, and a random access memory (RAM) in which the program is expanded. The computer (or the CPU) reads the program from the recording medium to execute the program, thereby achieving the object of the present invention. A "non-transient physical medium" such as a tape, a disk card, a semiconductor memory, and a programmable logic circuit can be used as the recording medium. The program may be supplied to the computer through any transmission medium, such as a communication network and a broadcasting wave, which can transmit the program. The present invention can be implemented even in a mode of a data signal. The data signal is embedded in a carrier wave, and the program is provided by electronic transmission in the data signal.

EXAMPLE 1

Example 1 of the present invention will be described below with reference to FIG. 11.

Figure 11:
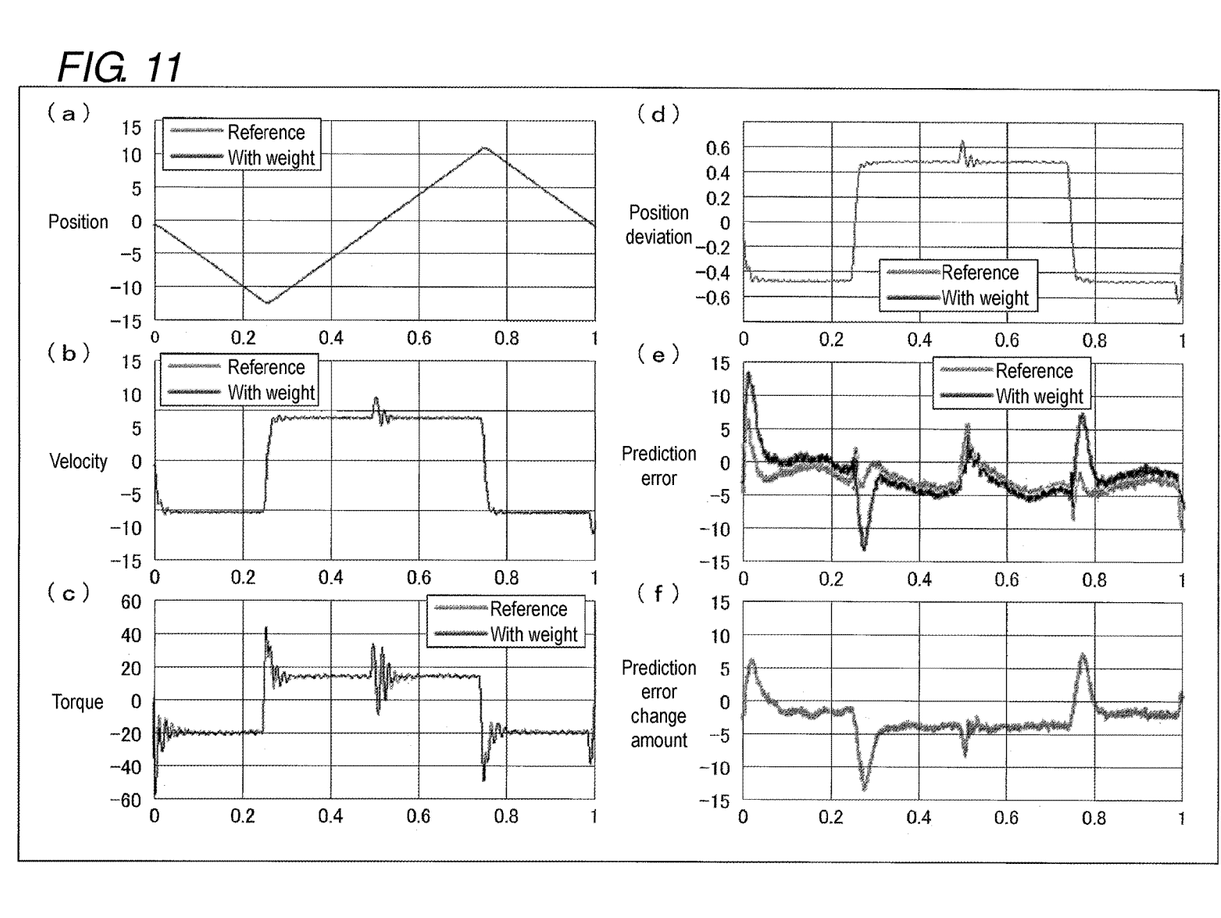
FIG. 11 is a waveform illustrating a case according to Example 1 of the present invention in which an orbit of a ball screw is controlled.

FIG. 11 is a waveform illustrating a case according to Example 1 in which an orbit of a ball screw is controlled.

Example 1 is applied to the fourth embodiment, and the mechanical part 3 corresponds to the ball screw. The control target model is set to the torque-velocity model for the mechanical part 3, and the controller 1C detects the presence of a weight that imitates a change in workpiece mass in a ball screw orbit control.

Graph (a) of FIG. 11 illustrates only a position on an X-axis in the ball screw orbit drawing a rhombus in a dual axis manner. In graph (a) of FIG. 11, a difference between the case with the weight and the case without the weight is substantially eliminated, and the case with the weight and the case without the weight are substantially superposed on each other. Graph (b) of FIG. 11 illustrates a slight change in velocity, and the change in graph (b) of FIG. 11 is hardly visually recognized from the controller 1C. Graph (c) of FIG. 11 illustrates a torque value from the servo driver 2. Generally, because the position deviation indicates control performance, the determination that the position deviation is larger than the reference value is made when some sort of change is generated. In the position deviation in graph (d) of FIG. 11, even if the characteristic changes, a shape is not changes as a whole, but only a minute difference appears. The change appears easily in the torque compared with the position deviation, the shape does not substantially change as a whole. On the other hand, in the prediction error of the torque-velocity model in graph (e) of FIG. 11, the large difference appears depending on the presence of the weight (the workpiece mass of the ball screw). Graph (f) of FIG. 11 illustrates the prediction error change amount.

As illustrated in Equation (5), a model M1 is represented by a primary transfer function using three parameters, namely, a time constant T of a continuous time system, a steady gain K, and a dead time L.

$$M1 = \frac{Ke^{-Ls}}{1+Ts} \quad (5)$$

EXAMPLE 2

Example 2 of the present invention will be described below with reference to FIG. 12.

Figure 12:
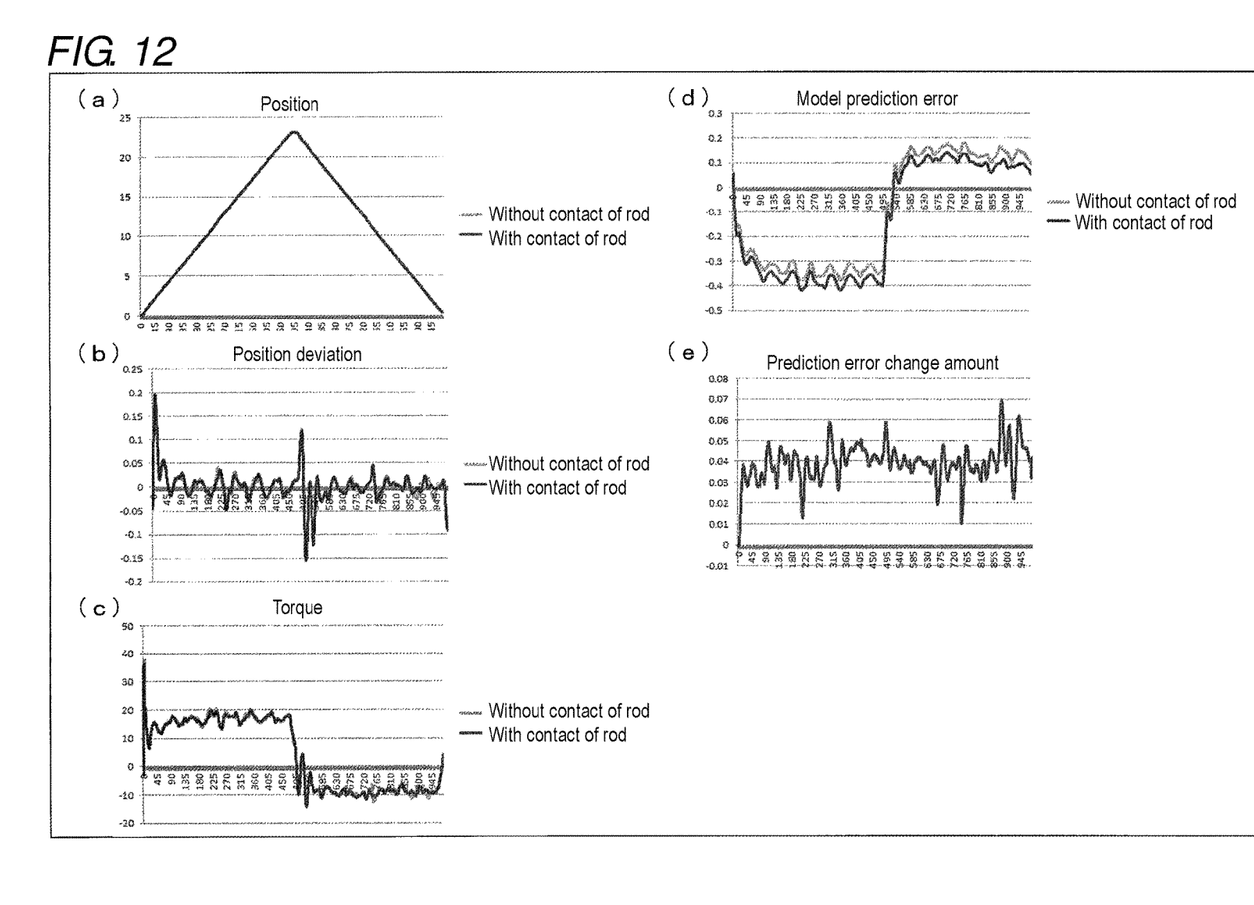
FIG. 12 is waveform illustrating a case according to Example 2 of the present invention in which a belt driving XY-table is controlled.

FIG. 12 is a waveform illustrating a case according to Example 2 of the present invention in which a belt driving XY-table is controlled.

Example 2 is applied to the second and third embodiments, and is a belt driving XY-table. The control target model is set to a position command value -position feedback value model of the mechanical part 3, and the change is detected in the case that a leading end of a rod attached to a Y-axis of the belt driving XY-table comes into contact with a table in the controllers 1A and 1B. Usually, in the belt driving XY-table, a pen is not in contact with a lower table.

However, in Example 2, a tape is wound around the pen to slightly contact with the table, thereby generating friction.

Graph (a) of FIG. 12 illustrates only a Y-axis portion XY in the orbit of the XY-table that draws the rhombus in a dual axis manner. In graph (a) of FIG. 12, the difference between the command position and the feedback position is substantially eliminated, and the command position and the feedback position are substantially superposed on each other.

Even if the rod contacts with the table to increase the friction, the influence of the friction is quickly absorbed by the feedback control of the servo driver 2. Therefore, when the case the rod is in contact with the table is compared to the case the rod is not in contact with the table, the large difference does not appear in the position deviation of graph (b) of FIG. 12 or the waveform data of the torque in graph (c) of FIG. 12. On the other hand, the relatively large difference between the both appears in the waveform data of the prediction error in graph (d) of FIG. 12. Graph (e) of FIG. 12 illustrates the prediction error change amount.

In Example 2, because of the composite model, a quadratic model is adopted as a model M2 as illustrated in Equation (6). Therefore, the prediction error difference can be recognized in the total model.

$$M2 = \frac{Ke^{-Ls}}{(1+T_1s)(1+T_2s)} \quad (6)$$

For the characteristic change or the disturbance of the mechanical part 3, the model only for the mechanical part 3 may be adopted as described in Example 1. However, in the case that the parameter of the servo driver 2 is changed, it is necessary to consider the model including the servo driver 2. The composite mode is required in the case that which one of the servo driver 2 and the mechanical part 3 attributes to the change is unclear.

The present invention is not limited to the embodiments, but various changes can be made without departing from the scope of the present invention. It is noted that the embodiment obtained by a combination of different embodiments is also included in the scope of the present invention.

The invention claimed is:

1. A control device for controlling a control target, the control device comprising a processor configured with a control program to perform operations comprising:
    operation as a command value generator configured to generate a command value;
    operation as a controller configured to control a control target based on the command value;
    operation as a predictor configured to predict a predictive output value of an output value to an input value with respect to a model of the control target and output the predictive output value;
    operation as a relational value calculator configured to calculate a prediction error as a relationship between the predictive output value of the predictor and a measured value of output of the control target; and
    operation as a relational value comparator configured to compare a first relational value to a second relational value, the first relational value being the prediction error in a reference state in which the control target is operated once to produce a prediction error reference characteristic, the second relational value being the prediction error in an operating state in which the control target is operated in a normal state.

2. The control device according to claim 1, wherein the processor is configured with the control program to perform operations such that operation as the relational value comparator comprises operation as the relational value comparator further configured to:
    calculate a difference between the first relational value and the second relational value, and
    compare the calculated difference between the first relational value and the second relational value to a predetermined threshold.

3. The control device according to claim 2, wherein the processor is configured with the control program to perform operations further comprising
    operation as a margin calculator configured to calculate a margin indicating a degree of margin of the second relational value to a permissible limit at which the difference between the first relational value and the second relational value reaches the threshold.

4. The control device according to claim 1, wherein
    the control target is a mechanical part, and
    the input value is a value of driving force driving the mechanical part.

5. The control device according to claim 1, wherein the processor is configured with the control program to perform operations further comprising
    operation as a change amount comparator configured to compare first change amount pattern of a change amount of the second relational value to the first relational value in setting the measured value for a specific parameter to a value different from a normal value to a second change amount pattern of a change amount of the second relational value to the first relational value in the operating state of the control target.

6. A non-transitory computer-readable recording medium having the control program according to claim 1 recorded thereon.

7. The control device according to claim 1, wherein the processor is configured with the control program to perform operations such that operation as the relational value comparator further comprises operation as the relational value comparator further configured to detect a characteristic change when the second relational value is larger than the first relational value.

8. The control device according to claim 7 wherein the processor is configured with the control program to perform operations such that operation as the relational value comparator further comprises operation as the relational value comparator further configured to detect when the characteristic change exceeds a predetermined reference value.

* * * * *